UNITED STATES PATENT OFFICE.

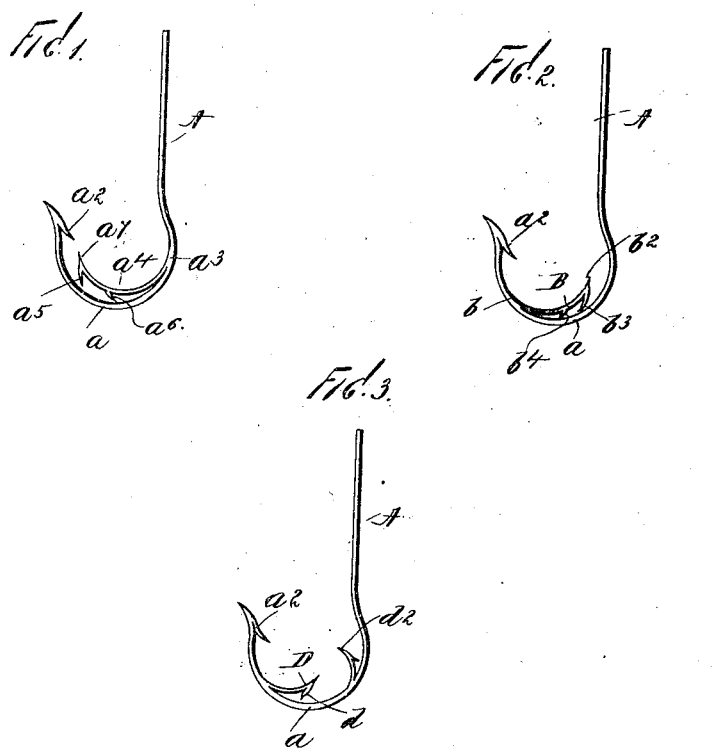

DIEDRICH A. FIEGE, OF NEW YORK, N. Y.

FISH-HOOK.

SPECIFICATION forming part of Letters Patent No. 666,309, dated January 22, 1901.

Application filed May 7, 1900. Serial No. 15,683. (No model.)

*To all whom it may concern:*

Be it known that I, DIEDRICH AUGUST FIEGE, a citizen of the United States, residing at New York, (Brooklyn,) in the county of Kings and State of New York, have invented certain new and useful Improvements in Fish-Hooks, of which the following is a full and complete specification, such as will enable those skilled in the art to which it appertains to make and use the same.

This invention relates to fish-hooks; and one object thereof is to provide a fish-hook with devices which will hold the bait thereon and prevent a fish from tearing or pulling the bait from the hook without being caught or at least hooked thereby, a further object being to provide a hook with devices for holding the bait in proper relative position thereon; and with these and other objects in view the invention consists in a fish-hook constructed as hereinafter described and claimed.

The invention is fully disclosed in the following specification, of which the accompanying drawings form a part, in which—

Figure 1 is a side view showing one form of my improved fish-hook, and Figs. 2 and 3 similar views showing modifications.

In the drawings forming part of this specification the separate parts of my improvement are designated by letters of reference, and in the practice of my invention as shown in Fig. 1 I provide a fish-hook, comprising a shank A, having the usual curved or bow portion, at the end of which is a barb $a^2$, and secured to or formed integrally with the curved or bow portion at the point where said curved or bow portion merges into the shank, as shown at $a^3$, is a supplemental attachment $a^4$, curved in the same manner and lying within the curved or bow portion $a$ of the hook, and the said attachment $a^4$ is provided at its end with a backwardly-directed barb $a^5$ and near the middle portion thereof and on the lower side with a backwardly-directed barb $a^6$ and at the end thereof with an outwardly-directed point $a^7$. By means of this construction the bait is securely held upon the hook, and in placing the bait upon the hook it may be so arranged as to cover the bow portion thereof and remain in such position, and the danger of the bait being removed from the hook either by pulling it directly therefrom or in a direction opposite to that of the barb $a^2$ is largely avoided, as the supplemental barbs $a^5$ and $a^6$ and the attachment $a^4$, pointed as shown at $a^7$, operate to hold the bait upon the hook and in proper relative position thereon.

In Fig. 2 the shank A, the curved or bow portion $a$, and the barb $a^2$, at the point thereof, are the same as in Fig. 1; but in this form of construction I employ an attachment B, which is secured to the inner side of the curved or bow portion $a$ of the hook, near the end thereof, as shown at $b$, and projects backwardly and upwardly toward the shank and is provided with a point $b^2$ and with two backwardly-directed barbs $b^3$ and $b^4$. This form of construction prevents the bait from moving in either direction, as will be readily understood, the point $b^2$ preventing said bait from moving in the direction of the barb $a^2$, while the barbs $b^3$ and $b^4$ prevent the bait from moving in the direction of the shank A.

In Fig. 3 I have shown another modification in which the shank A, the curved or bow portion $a$, and the barb $a^2$ are the same in Figs. 1 and 2; but in this form of construction the curved or bow portion $a$ of the hook is provided on the inner side, between the middle thereof and the barb $a^2$, with a backwardly-directed pointed attachment D, having a backwardly-directed barb $d$, and said curved or bow portion $a$ of the hook, between the middle thereof and the shank A, is provided with an upwardly and inwardly curved supplemental barb $d^2$. The operation of this form of construction will be similar to that shown in Fig. 2.

By means of my improvement the bait may be securely held on the hook so as to cover the bow portion, and the supplemental barbs or attachments will prevent the bait from being drawn bodily from the hook in any direction and will operate to compel the fish to swallow the hook in order to get the bait, and another advantage of this construction consists in the fact that the inner barbs or attachments will operate, after the fish has been struck or hooked, to prevent the fish from throwing or detaching the hook.

Having fully described my invention, I claim as new and desire to secure by Letters Patent—

1. A fish-hook the main curved or bow portion of which is provided with one or more similarly-curved attachments, one end whereof is free and pointed and provided with a barb, substantially as shown and described.

2. A fish-hook the curved or bow portion of which is provided on the inner side with a similarly-curved attachment, one end of which is free and pointed and provided with a backwardly-directed barb, substantially as shown and described.

3. A fish-hook the curved or bow portion of which is provided on its inner side and on one side of the middle of said curved or bow portion, with a similarly-curved attachment which crosses the middle of said curved or bow portion, and is provided with a pointed end, substantially as shown and described.

4. A fish-hook the curved or bow portion of which is provided on its inner side and on one side of the middle of said curved or bow portion, with a similarly-curved attachment which crosses the middle of said curved or bow portion, and is provided with a pointed end, and with a backwardly-directed barb, substantially as shown and described.

In testimony that I claim the foregoing as my invention I have signed my name, in presence of the subscribing witnesses, this 4th day of May, 1900.

DIEDRICH A. FIEGE.

Witnesses:
C. C. OLSEN,
F. A. STEWART.